United States Patent
Nguyen et al.

(10) Patent No.: US 12,180,001 B1
(45) Date of Patent: Dec. 31, 2024

(54) WASTE COLLECTION AND WEIGHING SYSTEM

(71) Applicant: WM Intellectual Property Holdings, L.L.C., Houston, TX (US)

(72) Inventors: Vu Nguyen, Houston, TX (US); Brian Hertz, Houston, TX (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

(21) Appl. No.: 18/883,795

(22) Filed: Sep. 12, 2024

Related U.S. Application Data

(60) Provisional application No. 63/538,037, filed on Sep. 12, 2023.

(51) Int. Cl.
| | |
|---|---|
| *B65F 3/02* | (2006.01) |
| *G01G 19/18* | (2006.01) |
| *G01G 21/22* | (2006.01) |
| *G01G 21/28* | (2006.01) |
| *G01G 19/52* | (2006.01) |

(52) U.S. Cl.
CPC ............. *B65F 3/02* (2013.01); *G01G 19/18* (2013.01); *G01G 21/22* (2013.01); *G01G 21/28* (2013.01); *B65F 2003/022* (2013.01); *B65F 2003/0223* (2013.01); *G01G 19/52* (2013.01)

(58) Field of Classification Search
CPC .............. B65F 3/02; B65F 2003/022; B65F 2003/0223; G01G 19/18; G01G 21/22; G01G 21/23; G01G 21/235; G01G 21/28

USPC .......................................................... 177/126
See application file for complete search history.

(56) References Cited

U.S. PATENT DOCUMENTS

| | | | | |
|---|---|---|---|---|
| 5,629,498 A * | 5/1997 | Pollock | ................. | A61B 90/98 177/244 |
| 7,348,501 B1 * | 3/2008 | Nugent, Jr. | ............ | G01G 21/23 177/199 |
| 8,853,568 B2 * | 10/2014 | Shinozaki | ................ | G01G 3/16 177/239 |
| 9,557,209 B2 * | 1/2017 | Savage | ..................... | B65D 7/24 |
| 11,768,101 B2 * | 9/2023 | Smith | ..................... | G01G 21/23 177/144 |
| 2018/0216989 A1 * | 8/2018 | Servin | ..................... | G01G 21/23 |
| 2022/0104636 A1 * | 4/2022 | Chila | ..................... | G16H 40/40 |
| 2023/0002151 A1 | 1/2023 | Kling et al. | | |

FOREIGN PATENT DOCUMENTS

| | | |
|---|---|---|
| CN | 208119942 U | 11/2018 |
| CN | 110683244 A | 1/2020 |
| EP | 3650372 A1 | 5/2020 |
| KR | 102282421 B1 | 7/2021 |
| WO | 2024/165843 A1 | 8/2024 |

* cited by examiner

*Primary Examiner* — Randy W Gibson

(74) *Attorney, Agent, or Firm* — Greenberg Traurig LLP

(57) ABSTRACT

A waste collection and weighing system for measuring the weight of waste and recycling containers and their contents is provided. The waste collection and weighing system can include a platform having an opening formed therein, a frame body configured to sit atop the platform adjacent to the opening, and a load cell attached to the frame body. The waste collection and weighing system is a load-cell-based weight measurement device and the rigid frame body is configured for both hanging and weighing the waste container.

6 Claims, 7 Drawing Sheets

WASTE COLLECTION AND WEIGHING SYSTEM

RELATED APPLICATION

This application claims the benefit, and priority benefit, of U.S. Provisional Patent Application Ser. No. 63/538,037, filed Sep. 12, 2023, the disclosure and content of which is incorporated by reference herein in its entirety.

BACKGROUND

1. Field of the Invention

The presently disclosed subject matter relates generally to a waste collection and weighing system, and more particularly, to a waste collection and weighing system for measuring the weight of a hanging waste container and its contents.

2. Description of the Related Art

Many organizations seek to track the amount of waste and recycling that is being generated on their premises as a proxy for their efforts to be a more environmentally conscious company. Measurements of volume (such as for materials collected by front-end-load containers) or by weight of final collection containers (such as for materials collected via compactor or roll-off container) are used to approximate a diversion rate for the facility or organization. If weights are able to be captured, it is nearly always at the point of truck collection or disposal (as the truck passes over the scale) at a landfill or material recovery facility.

Improvements in this field of technology are desired.

SUMMARY

Various illustrative embodiments of a waste collection and weighing system are provided herein.

In certain illustrative embodiments, the waste collection and weighing system can include: a platform having an opening formed therein; a frame body configured to sit atop the platform adjacent to the opening; a load cell disposed on the frame body, the load cell having an upward-facing engagement face; and a waste container having a downward-facing lip formed thereon, wherein the downward-facing lip is configured to rest on the upward-facing engagement face of the load cell when the waste container is inserted into the opening in the platform, wherein the load cell is configured to measure the weight of the waste container and its contents when the downward-facing lip of the waste container rests on the upward-facing engagement face of the load cell and the waste container hangs from the frame body.

In certain aspects, the system can further include a display screen operatively connected to the load cell and configured to display the weight of the waste container and its contents. The frame body can include a front rail, a back rail, a first side rail and a second side rail, and the first side rail and the second side rail can be adjustable such that the frame body can rest within the opening in the platform. The front rail and the back rail can be arranged in a parallel orientation. The load cell can sit atop the front rail or the back rail. If there is more than one load cell, then each load cell can sit atop either the front rail or the back rail.

In certain aspects, the system can include a plurality of load cells disposed on the frame body, wherein each load cell has an upward-facing engagement face, and wherein each load cell sits atop the front rail or the back rail.

BRIEF DESCRIPTION OF THE DRAWINGS

A better understanding of the presently disclosed subject matter can be obtained when the following detailed description is considered in conjunction with the drawings and figures herein, wherein.

Figure 1:
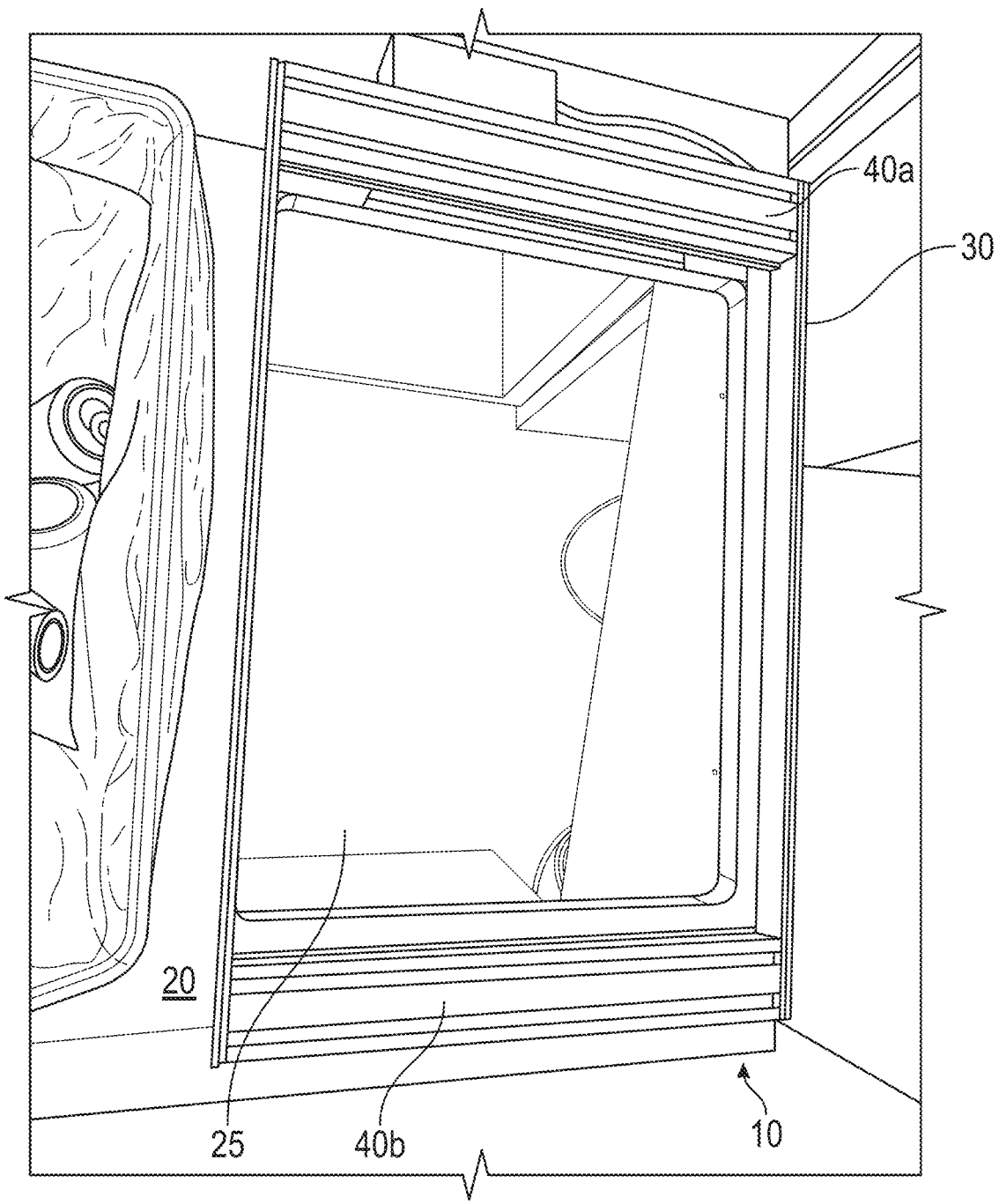
FIG. 1 is a top perspective view of a frame body of a waste collection and weighing system before insertion of a waste container, in accordance with an illustrative embodiment of the presently disclosed subject matter.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates to a waste collection and weighing system for measuring the weight of waste and recycling containers and their contents. Illustrative embodiments of the waste collection and weighing system 10, which can also be known as a "connected scale" device, and its various components and features are shown in FIGS. 1-7 herein.

In certain illustrative embodiments, the waste collection and weighing system 10 can include: a platform 20 having an opening 25 formed therein; a frame body 30 configured to sit atop the platform 20 adjacent to the opening 25; a load cell 40 attached to the frame body 30, the load cell 40 having an upward-facing engagement face 45; a waste container 50 having a downward-facing lip 55 formed thereon, wherein the downward-facing lip 55 is configured to rest on the upward-facing engagement face 45 of the load cell 40 when the waste container 50 is inserted into the opening 25 in the platform 20; and a display screen 60 operatively connected to the load cell 40 and configured to display the weight of the waste container 50 and its contents when the downward-facing lip 55 of the waste container 50 rests on the upward-facing engagement face 45 of the load cell 40 and the waste container 50 hangs from the frame body 30.

FIG. 1 shows frame body 30 before insertion of the waste container 50. In certain illustrative embodiments, waste collection and weighing system 10 is a load-cell-based weight measurement device with a rigid frame body 30 that is configured for both hanging and weighing the waste container 50.

Figure 2:
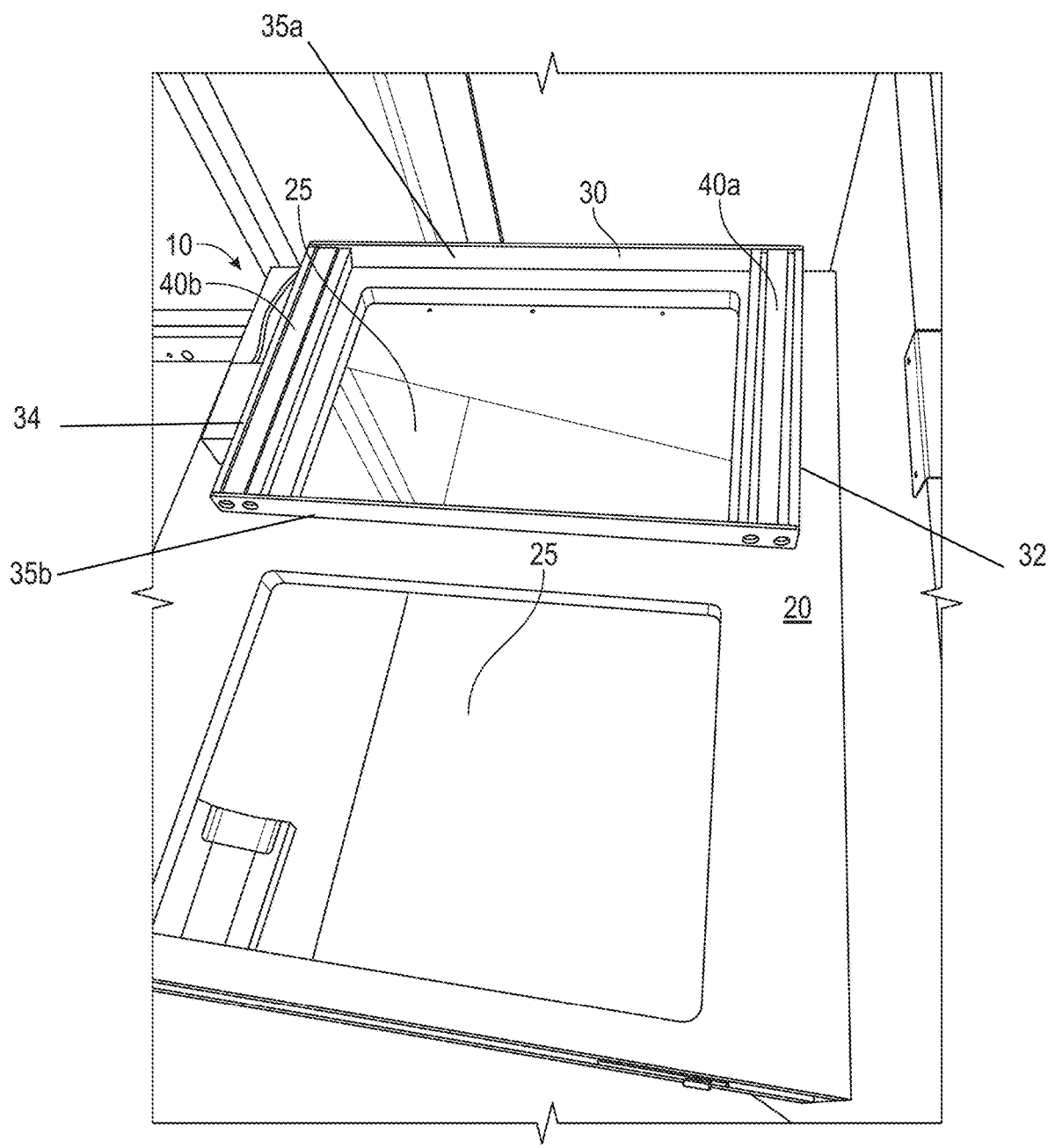
FIG. 2 is a top perspective view of a comparison of an uninstalled vs. installed waste collection and weighing system, in accordance with an illustrative embodiment of the presently disclosed subject matter.
Figure 3:
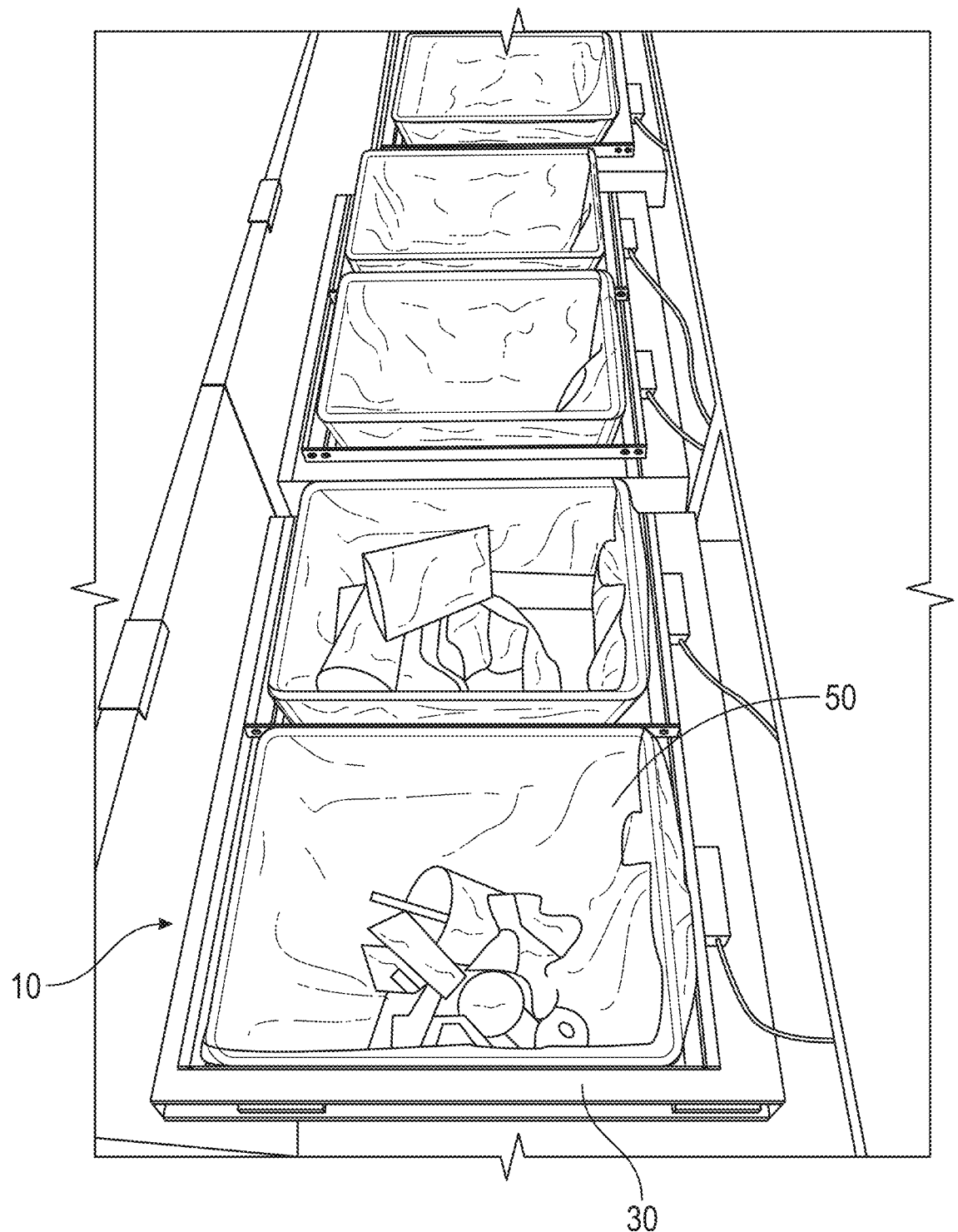
FIG. 3 is a plurality of fully installed, side-by-side waste collection and weighing systems, in accordance with an illustrative embodiment of the presently disclosed subject matter.

FIG. 2 shows a comparison of an uninstalled vs. installed waste collection and weighing system 10. FIG. 3 shows a plurality of fully installed, side-by-side waste collection and weighing systems 10.

Figure 4:
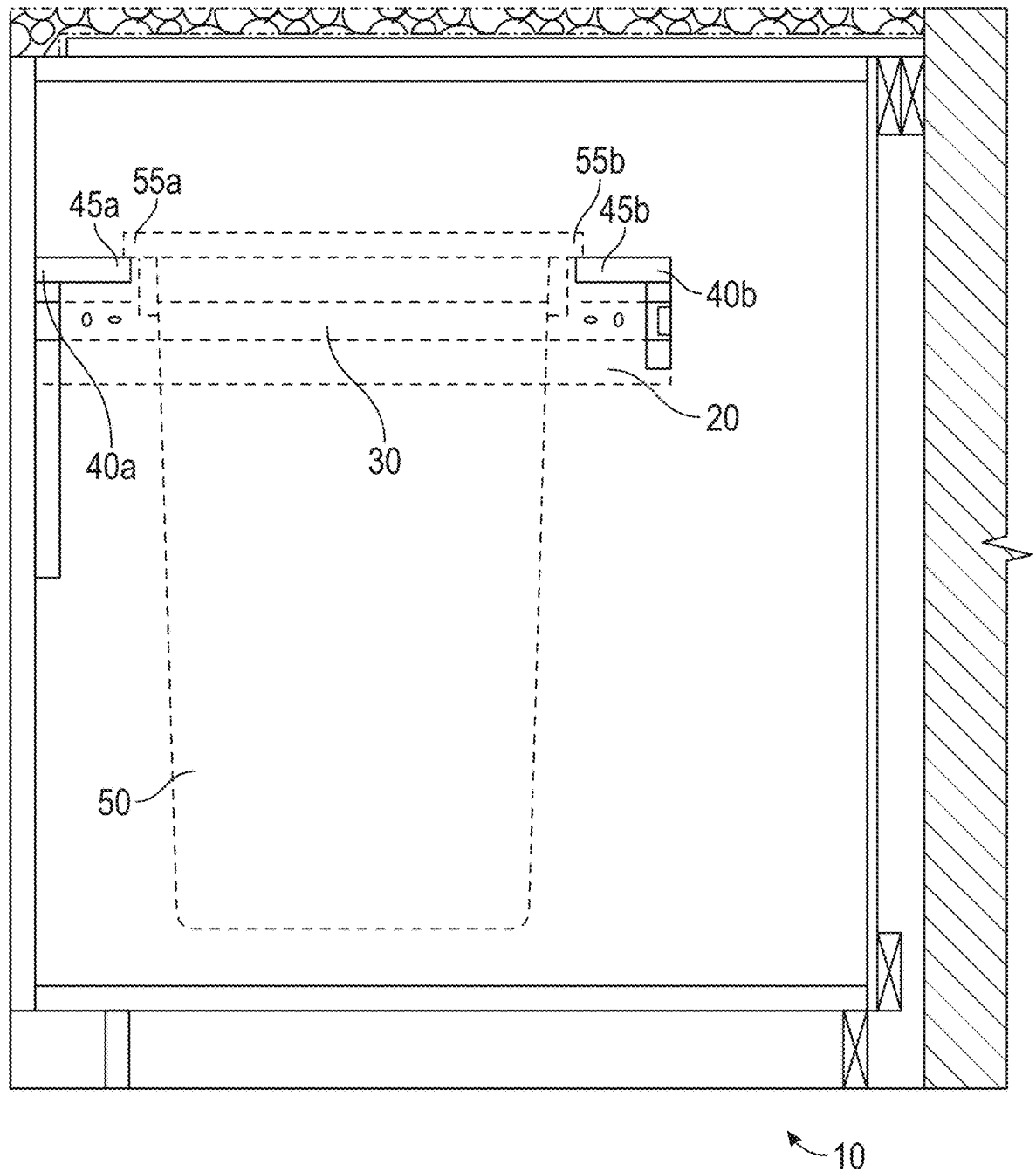
FIG. 4 is a side view of a waste collection and weighing system, in accordance with an illustrative embodiment of the presently disclosed subject matter.

FIG. 4 shows a side view of the waste collection and weighing systems 10. In certain illustrative embodiments, the waste collection and weighing system 10 comprises frame 30 which can be made of wood, plastic, glass or other material. Referring back to FIG. 2, the frame 30 can have a generally square or rectangular shape with a front rail 32, a back rail 34 and a pair of side rails 35 comprising a first side rail 35a and a second side rail 35b. The front rail 32 and the back rail 34 can be in a generally parallel orientation. The terms "front" and "back" are used interchangeably here, and shall not be construed as limiting as to orientation of the frame 30 in the opening 25. The waste collection and weighing system 10 is designed such that the waste container 50 will hang from the frame 30. The front rail 32, back rail 34 and side rails 35a, 35b of the waste collection and weighing system 10 of the scale can be rigid, or alternatively, can be adjusted (e.g., slidingly adjustable) to accommodate a slightly bigger or smaller size of waste container 50 and/or opening 25.

Figure 5:
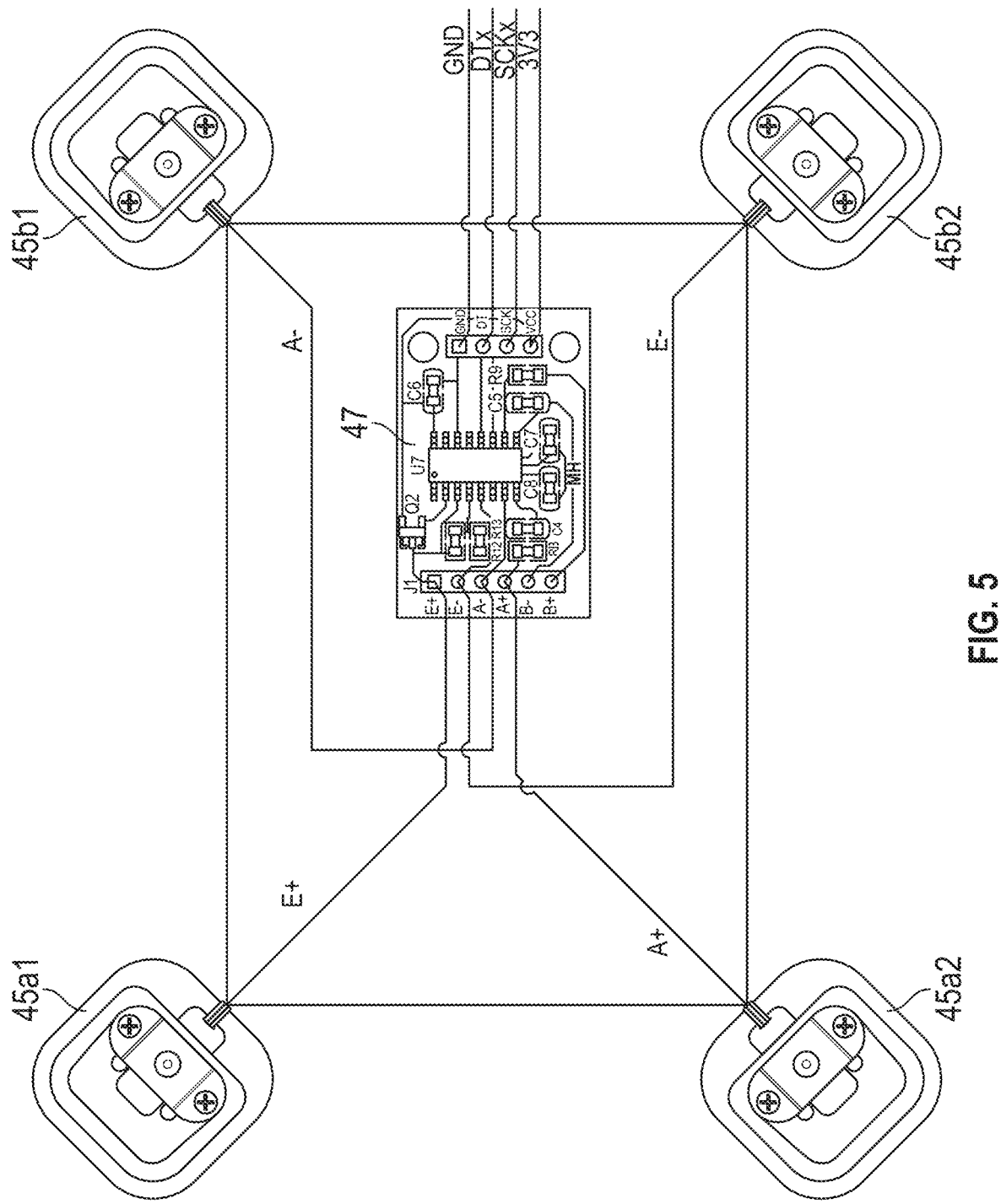
FIG. 5 is a top view of a wiring diagram for a plurality of load cells in a waste collection and weighing system, in accordance with an illustrative embodiment of the presently disclosed subject matter.

FIG. 5 shows a wiring diagram for a plurality of load cells 45. The load cells 45 can be attached or otherwise placed on the top of the front rail 32 and back rail 34 of the frame 30 to enable weighing of the container 50. The load cell 40 can have an upward-facing engagement face 45, and the waste container 50 can have a downward-facing lip 55 formed thereon. The downward-facing lip 55 can be configured to rest on the upward-facing engagement face 45 of the load cell 40 when the waste container 50 is inserted into the opening 25 in the platform 20. The load cells 45 can measure the weight of the waste container 50 and its contents when the downward-facing lip 55 of the waste container 50 rests on the upward-facing engagement face 45 of the load cell 40 and the waste container 50 hangs from the frame body 30.

FIG. 5 provides an individual scale wiring diagram to show how the load cells 45 are wired up to the module 47. In FIG. 5, four load cells 45 are utilized (45a1, 45a2, 45b1 and 45b2), but more or fewer load cells 45 can be utilized as needed. In certain illustrative embodiments, the number and placement of load cells 45 can vary based on, e.g., the degree of specificity needed for the weight measurement for waste container 50. In certain illustrative embodiments, the module 47 used for reading the load cells 45 is the HX711.

Figure 6:
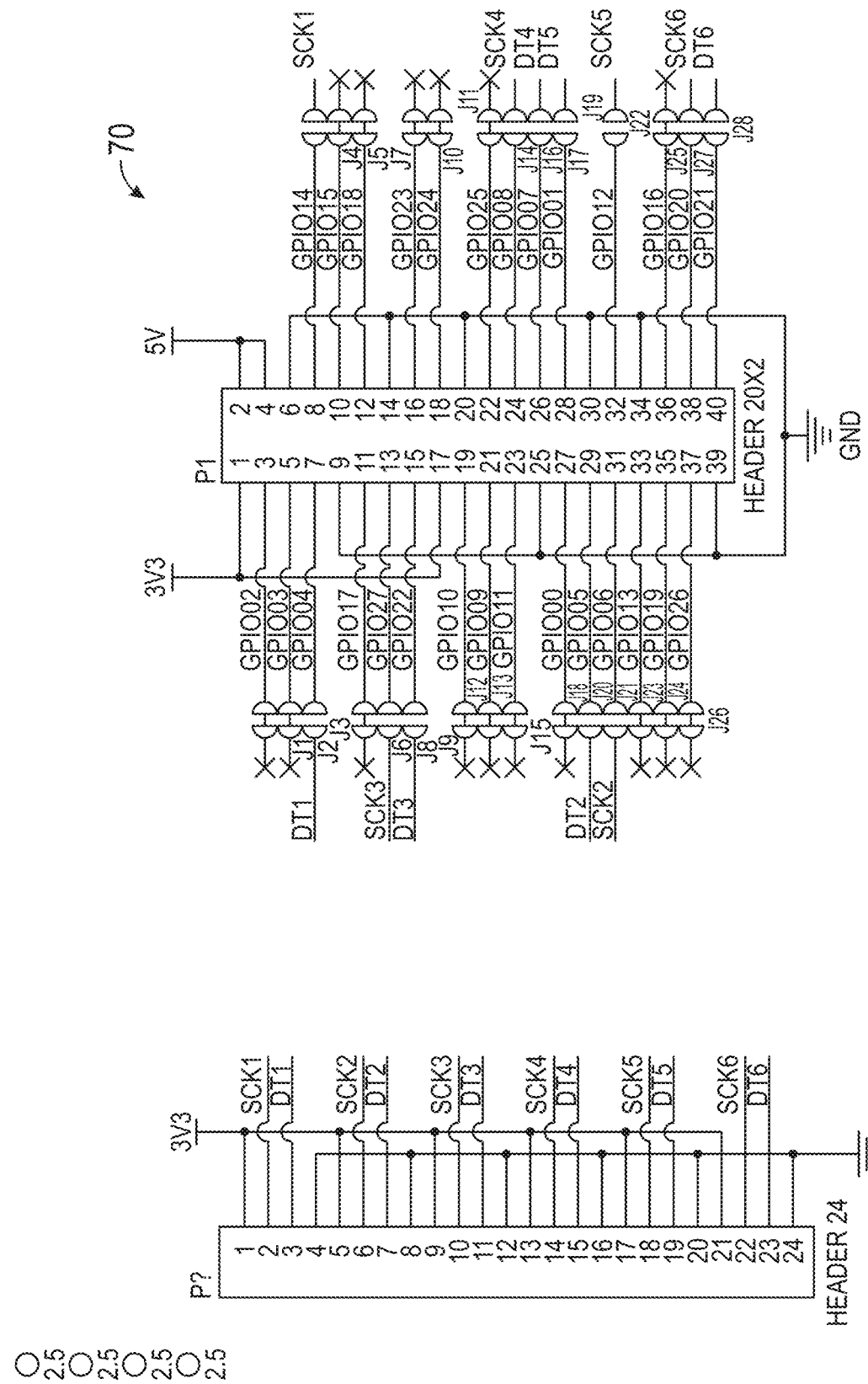
FIG. 6 is a raspberry pi scale hat diagram shows the wiring of a plurality of scale modules for a waste collection and weighing system, in accordance with an illustrative embodiment of the presently disclosed subject matter.

FIG. 6 shows a raspberry pi scale hat diagram 70 shows the wiring of the scale modules 47 to the raspberry pi pinout. In the illustrative embodiment of FIG. 6, the map illustrates how six scale modules can load into a single pinout. In other embodiments, the device would be able to have any number of loading configurations. Moreover, while the illustrative embodiment of FIG. 6 shows a configuration for a raspberry pi, any small computer device that can process simple algorithms and commands can be utilized without departing from the spirit and scope of the presently disclosed subject matter.

Figure 7:
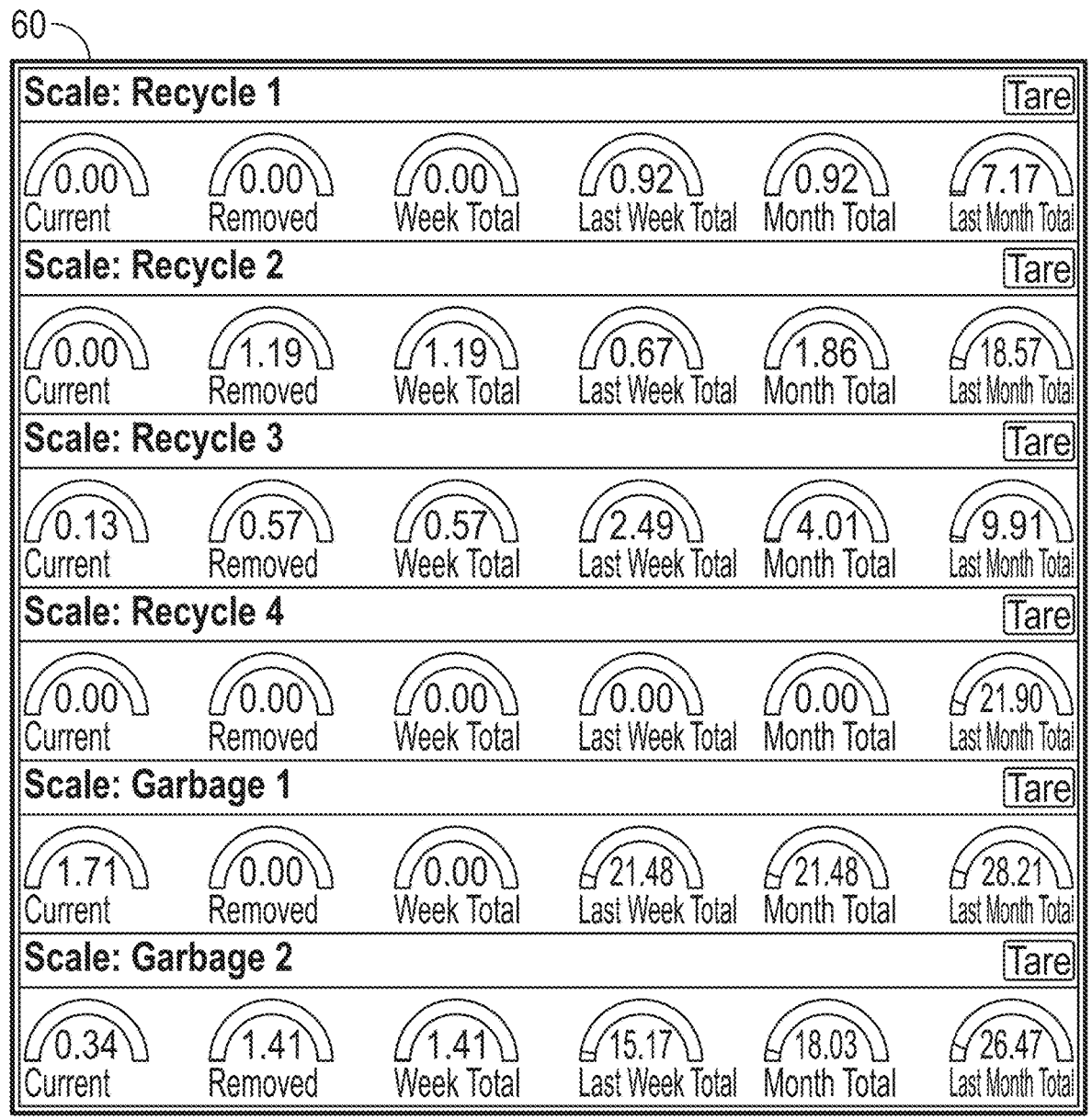
FIG. 7 is a visual interface for displaying data collected by a plurality of load cells for a waste collection and weighing system, in accordance with an illustrative embodiment of the presently disclosed subject matter.

FIG. 7 shows an illustrative embodiment of a visual interface for displaying data collected by the load cells 45. In certain illustrative embodiments, a display screen 60 is operatively connected to the load cell 40 and configured to display the weight of the waste container 50 and its contents when, for example, the downward-facing lip 55 of the waste container 50 rests on the upward-facing engagement face 45 of the load cell 40 and the waste container 50 hangs from the frame body 30. Data is collected from the waste collection and weighing system 10 via an API which provides data on the current weight of material inside the waste container 50. The system code contains unique logic that enables it to determine when the contents of waste container 50 have been emptied and signals for the system to capture that weight as an emptied waste container 50 and reset to zero. Historical data is captured and stored in a database for future access. In certain illustrative embodiments, the system is equipped to visualize data across numerous containers. Additionally, each container is able to be manually tared via the online portal.

In certain illustrative embodiments, the devices are connected to a power supply and a standard wall outlet, but could also or alternatively be managed via battery without a wired electrical connection.

In certain illustrative embodiments, the device communicates via wireless network to other devices, but in some embodiments it can be equipped with Bluetooth Low Energy or other short range communication equipment.

The presently disclosed design has a number of improvements over the existing art. The ability to track the weight of material being discarded into individual bins and displayed in "real time" is an important aspect of engaging stakeholders in sustainability and waste diversion efforts. Not all waste scales have the ability to connect to the internet and display current and historical weight data.

Additionally, a large portion of waste weighing devices on the current market are designed to be used on the ground or supported by the bottom of a shelf, drawer bottom, or countertop. Many office waste containers do not sit on a platform that would enable the use of a traditional scale. Instead, any weight capture device for these containers must "hang" from the top of the drawer along with the container itself. Scales are used in some applications to track the weight of waste and recycling being discarded into receptacles, but most are large and bulky. The presently disclosed design is an improvement that addresses these (and other) issues.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A waste collection and weighing system, comprising:
a platform having an opening formed therein;
a frame body configured to sit atop the platform adjacent to the opening;

a load cell disposed on the frame body, the load cell having an upward-facing engagement face; and a waste container having a downward-facing lip formed thereon, wherein the downward-facing lip is configured to rest on the upward-facing engagement face of the load cell when the waste container is inserted into the opening in the platform, wherein the load cell is configured to measure the weight of the waste container and its contents when the downward-facing lip of the waste container rests on the upward-facing engagement face of the load cell and the waste container hangs from the frame body.

2. The system of claim 1, further comprising a display screen operatively connected to the load cell and configured to display the weight of the waste container and its contents.

3. The system of claim 1, wherein the frame body comprises a front rail, a back rail, a first side rail and a second side rail, and wherein the first side rail and the second side rail are adjustable such that the frame body can rest within the opening in the platform.

4. The system of claim 1, wherein the front rail and the back rail are arranged in a parallel orientation.

5. The system of claim 1, wherein the load cell sits atop one of the front rail or the back rail.

6. The system of claim 1, further comprising a plurality of load cells disposed on the frame body, wherein each load cell has an upward-facing engagement face, and wherein each load cell sits atop the front rail or the back rail.

\* \* \* \* \*